July 27, 1954
C. GRANTHAM
2,684,831
TURBINE AND LIKE ROTOR
Filed Nov. 22, 1948
2 Sheets-Sheet 1
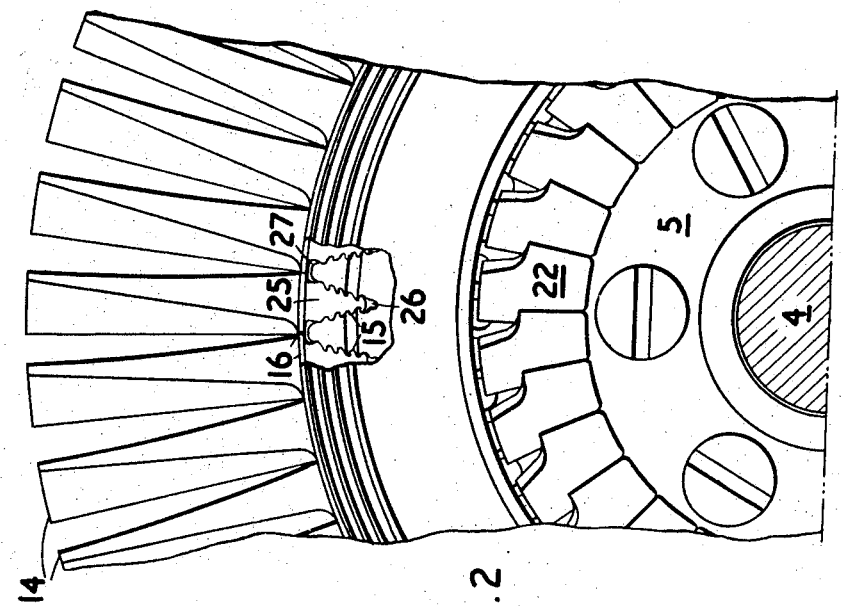
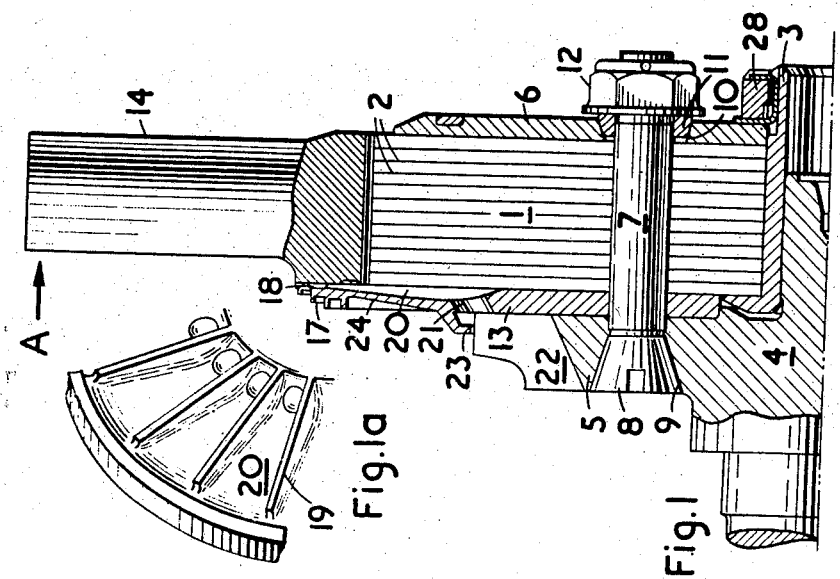
Inventor
Cyril Grantham
By
Stevens Davis Miller & Mosher
his Attorneys July 27, 1954  C. GRANTHAM  2,684,831
TURBINE AND LIKE ROTOR
Filed Nov. 22, 1948  2 Sheets-Sheet 2
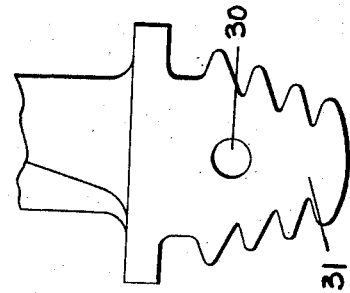
Fig.3.
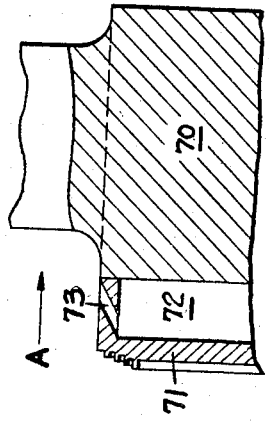
Fig.7.
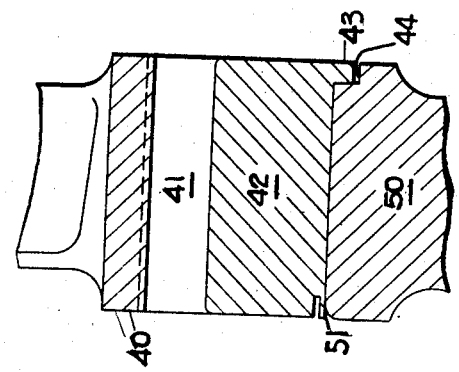
Fig.5.
Fig.5a.
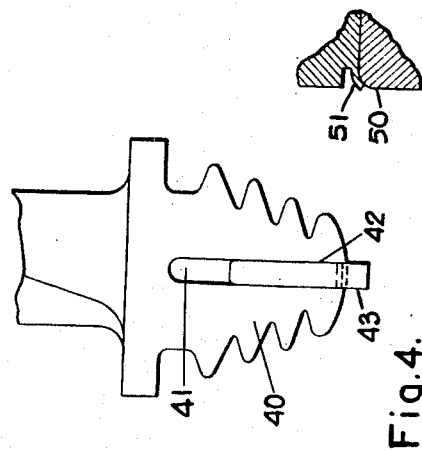
Fig.4.
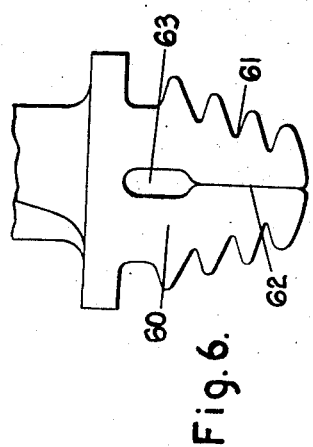
Fig.6.
Inventor
Cyril Grantham
By
Stevens Davis Miller + Mosher
his Attorneys Patented July 27, 1954

2,684,831

UNITED STATES PATENT OFFICE 2,684,831

TURBINE AND LIKE ROTOR

Cyril Grantham, Leicester, England, assignor to Power Jets (Research and Development) Limited, London, England, a British company Application November 22, 1948, Serial No. 61,416

The invention herein described is hereby dedicated to the free use of the People in the territory of the United States of America to take effect on the granting of this patent and to persist for the entire term thereof 3 Claims. (Cl. 253—39.15)

This invention relates to rotors of axial flow turbines and similarly bladed fluid flow machines. Primarily, the invention is concerned with certain problems which arise in the case of rotors which are built up from sheet metal laminae assembled as a pack, examples of which rotors are described in the specification of United States Letters Patent to Atkinson, No. 2,613,058. As will be seen, however, in certain respects the invention also has useful application in the wider field of turbine and similarly bladed rotors generally of fluid flow machines.

According to the invention, the rotor of an axial flow turbine or similarly bladed fluid flow machine has on one or both of its external faces, a shroud having peripherally continuous rim which either coincides substantially with the rim of the rotor proper, or (in the case where separately fabricated blades are attached to the rotor) at least extends radially beyond the radially innermost ends of the blade roots.

According to a further feature of the invention the face of the shroud adjacent to the rotor body is hollowed to define with the rotor body a cavity having an air inlet at a radially inner zone and an outlet at a radially outer zone, so that in operation a flow of cooling air will pass through the cavity in a radially outward direction. As applied to a rotor in which the blades are fabricated separately and engaged in recessed seatings in the rotor body, the invention further contemplates that the air outlet will be through a passage or passages either beneath (i. e. radially inwardly of) the blade root or through its body, or under a platform from which the profiled blade portion springs, or through a combination of such passages.

Preferably the coolant cavity behind the shroud is divided into a number of radial channels by the provision of radial ribs shutting against the face of the rotor, so that the shroud constitutes in effect a centrifugal impeller; in this connection, the channels may with advantage be designed so as to have a constant-cross-section throughout their length. The object in view here is that the shroud, considered as a centrifugal impeller, should be capable of generating a sufficient pressure at the entrance to the passage or passages through or under the blades, to give a positive pressure differential as compared with the pressure obtaining at the outlet ends of these passages at the opposite face of the rotor. It is considered that as a general rule the static pressure head due to the rotation of the shroud will be sufficient for the purpose without involving the aerodynamic difficulties which might arise if the radial channels were designed as diffusers to convert some of the radial velocity into pressure. The latter arrangement would, however, be of advantage in offering a larger pressure differential and could be used should the general conditions allow the design of the channels to be satisfactory from the aerodynamic point of view.

The shroud may further be combined with a centrifugal fan mounted on the rotor hub or its shaft and providing for an initial flow of air, part of which passes up the external face of the shroud and part of which is split off and guided into the radial channels behind the shroud by a suitable lip thereon.

A further feature arising in the practical application of the invention in conjunction with the cooling of the anchoring roots of blades which are fabricated separately from the rotor and mounted by engagement of their root portions in seatings therein, is concerned with the formation of cooling passages within such blade roots. In accordance with such further feature of the invention, which may also be used in other cases in which a passage is required through a blade root, such a passage is afforded by a slot extending into the root from its tip (i. e. towards the working section of the blade), the open end of this slot at the root tip being closed either by a separate closure or by pressing together the sides of the slot prior to any machining of the external root faces that may be required.

An object of this invention is to provide a bladed fluid flow machine in which an assembled laminated rotor, ribbed shroud and blades form coolant fluid passage means about and through the rotor body for movement of coolant fluid from a radially inner position to and through the rotor and blade attachment portion of the assembly.

Fig. 1 is a half axial cross-sectional view of one embodiment of the invention.

Fig. 1a is a partial view of the shroud showing the ingress openings and radial ribs.

Fig. 2 is an elevational view of the structure of Fig. 1.

Figs. 3, 4 and 5, 5a, and 6 show modifications in which a coolant passage is provided in the blade root sections.

Fig. 7 shows a modification in which the coolant is ejected in the same direction as the working fluid stream.

With reference to the figures, the rotor is designed for overhung mounting by means of a bearing (not shown) on its upstream side (the general direction of flow of the working fluid being indicated by the arrow A in Figure 1). The rotor body 1 is made up of a multiplicity of discs 2 each having a central hole to accommodate a flanged sleeve 3, which, in turn engages a shaft 4. The rotor body is secured by being clamped tightly between a massive flange 5 on the shaft 4 on the upstream side (with respect to the flow of working fluid indicated by the arrow A) of the rotor and a reinforcing plate 6 on the downstream side by means of bolts 7 annularly disposed around the shaft and making a tight fit in aligned holes in the laminae of the rotor, these bolts having coned heads 8 fitted in correspondingly coned recesses 9 in the shaft flange and being located in coned holes 10 in the plate 6 on the downstream side of the rotor by radially slotted coned bushes 11 adapted to be pressed home by tightening nuts 12 threaded on the bolts. Between the flange 5 and the rotor body is disposed a shroud plate 13 which is also apertured for the passage of the securing bolts and is a tight fit thereon, and extends to the rim of the rotor. The rotor blades 14 are separately fabricated and mounted in axially extending seatings 15 which in this case are of the conventional "fir-tree" type, the blades having platforms 16 which are in gas-tight abutment and form the effective periphery of the rotor with which the rim of the shroud is flush. The rim of the shroud is concentrically machined to form one element 17 of a labyrinth seal, the other element of which is formed on stationary structure associated with the rotor (not shown). The face of the shroud 13 adjacent to the rotor body 1 is hollowed to afford a peripherally extending cavity 18, and, by means of ribs 19 which abut against the face of the rotor body 1, a series of radial channels 20 (as shown in the scrap view in Figure 1a), each having at their radially inner ends air inlets formed by holes 21 in the shroud. These inlets 21 are arranged to lie in the region of the tips of impeller blades 22 of a fan provided on the shaft flange 5, and there is an upstanding annular lip 23 encircling the air inlets so that the discharge of the fan is partly diverted to the radial channels 20 and partly passes up the external face 24 of the shroud. The radial channels 20 are designed to have a varying axial depth from the face of the rotor body such that the cross-sectional area of the channels with increasing radius remains constant or approximately so. In this way the pressure generated at the radially outer ends of the radial channels will correspond substantially to the static pressure rise due to rotation of the shroud with the rotor, without either diffusion or acceleration of the radial flow. The blade seatings 15 are formed at their radially inner ends with grooves forming below the radially inner ends of the blade roots 25 axial passages 26 which are open to the channels 20 in the shroud 13, and are also open to the downstream side of the rotor. Similarly, the blade platforms 16 and the parts of the blade roots 25 immediately below them are arranged to have a clearance from the rotor body providing further axial passages 27. The flanged sleeve 3 is provided with an end nut 28 by which the disc 2 of the rotor body and the reinforcing plate 6 are held in unified assembly to facilitate their handling when detached from the shaft 4.

Alternatively, or additionally to the provisions of the constructional embodiment of the invention described in the foregoing for affording passages for air at the blade roots, the methods illustrated in Figures 3, 4, 5 and 6 of the accompanying drawings may be adopted. Each of these figures represents the root portion of a blade intended for engagement in an axially extending seating in the periphery of the rotor body. In the embodiment shown in Figure 3, a hole 30 is provided through the blade root 31. In Figure 4, the blade root 40 is provided with a slot 41 into which an insert 42 is introduced, leaving sufficient of the slot 41 unfilled to afford a passage. Figure 5 shows a cross-section of the same blade root in the plane of the slot 41; the insert 42 may be provided with one projection 43 which engages a shoulder 44 formed on the rotor body 50, and another projection 51 which may be deformed after assembly, as shown in the scrap view Figure 5a, and thus may be secured against axial movement. In Figure 6, the blade root 60, prior to the formation of its rotor engaging surfaces 61, is slotted, and the sides 62 of the slot are pressed together over a part of its depth, leaving a passage 63. Each blade root shown in Figures 3-6 may have the serrations of the "fir-tree" truncated to provide additional axial passages.

Figure 7 of the accompanying drawings illustrates a constructional embodiment of the invention whereby cooling of the rotor rim is effected which is not dependent on the use of axial passages at the blade roots, and which is therefore suitable for rotors of which the blades are integral. With reference to Figure 7, the rotor body 70 is provided with a shroud 71 having a cavity 72 into which air is admitted at a radially inward region, and from which it is expelled through outlets 73 on the rim of the shroud. These outlets are so positioned and inclined as to eject the air as nearly as possible in the same direction as the working fluid stream (indicated by the arrow A) to form a layer of insulating air over the rotor periphery.

It will be appreciated from the foregoing that from the cooling point of view, the invention offers the possibility of keeping the rotor body cool by insulation against the entry of heat through the blade roots, thus allowing the use of materials for the rotor which need not have special heat resisting characteristics, and yet avoiding weakening of the rotor by the formation of internal coolant passages; further, that in the case of a laminar rotor the shroud can be a relatively massive element in which a seal can be formed without difficulty, this allowing the designer greater freedom in the choice of thickness for the outer laminae. In addition it is thought that the method of assembly of a laminar rotor proposed in the foregoing should eliminate difficulties which have been experienced in maintaining concentricity of the laminae in such a case.

I claim:

1. A rotor in or for an axial flow turbine or similarly bladed fluid flow machine, comprising a multiplicity of discs integrated to form a laminated rotor body, a plurality of blades disposed peripherally on said body, each blade having a root portion affording centrifugal load resistant attachment of the blade to each one of at least three discs, said root portions providing fluid passage means from one side of the rotor body to the other when the blades are in operating position, a shroud having radial ribs on its side facing an outer one of said discs, means drawing said discs together and said shroud against said outer disc, said shroud extending to the periphery of said rotor body, and said shroud, shroud ribs and outer disc defining radially extending cavities about the face of the said rotor body, an ingress fluid passage through the shroud at a radially inner point of each said cavities and each of said cavities being in communication with one of the said rotor body passage means whereby entering coolant moves through the cavities and is expelled through the rotor body fluid passage means.

2. The combination of claim 1 further defined in that said cavities are of substantially constant cross section throughout their radial length.

3. The combination of claim 1 further defined in that at least three of said discs including said outer disc are peripherally recessed to afford axially extending grooves in the periphery of said rotor body, each complementary to and accommodating the root section of a blade to provide said load resistant attachment thereof, and said grooves and root sections forming said rotor body passage means leading from said cavities.

References Cited in the file of this patent

UNITED STATES PATENTS

| Number | Name | Date |
|---|---|---|
| 702,461 | Nadrowski | June 17, 1902 |
| 764,230 | Edwards | July 5, 1904 |
| 840,457 | Hill | Jan. 1, 1907 |
| 1,445,142 | Kirkham | Feb. 13, 1923 |
| 2,141,401 | Martinka | Dec. 27, 1938 |
| 2,187,033 | Hubacker | Jan. 16, 1940 |
| 2,296,701 | Butler et al. | Sept. 22, 1942 |
| 2,336,767 | Ash | Dec. 14, 1943 |
| 2,354,304 | Celio | July 25, 1944 |
| 2,364,189 | Buchi | Dec. 5, 1944 |
| 2,390,506 | Buchi | Dec. 11, 1945 |
| 2,427,614 | Meier | Sept. 16, 1947 |
| 2,613,058 | Atkinson | Oct. 7, 1952 |

FOREIGN PATENTS

| Number | Country | Date |
|---|---|---|
| 491,738 | Germany | Feb. 12, 1930 |
| 516,781 | Great Britain | Jan. 11, 1940 |
| 630,395 | Great Britain | Oct. 12, 1949 |